Sept. 26, 1967
C. A. PEEK, JR
3,343,417
TEMPERATURE AND PRESSURE PROBE
Filed April 12, 1965
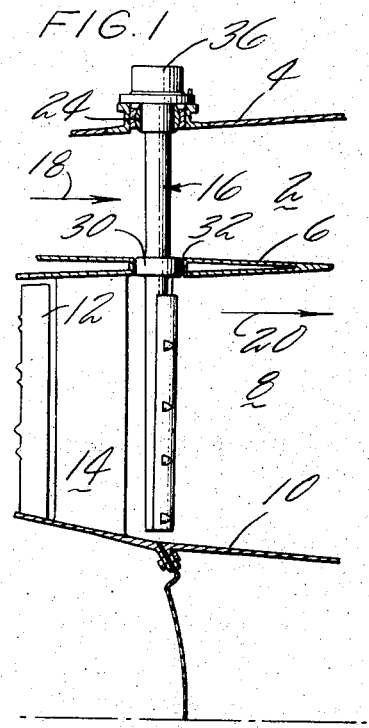
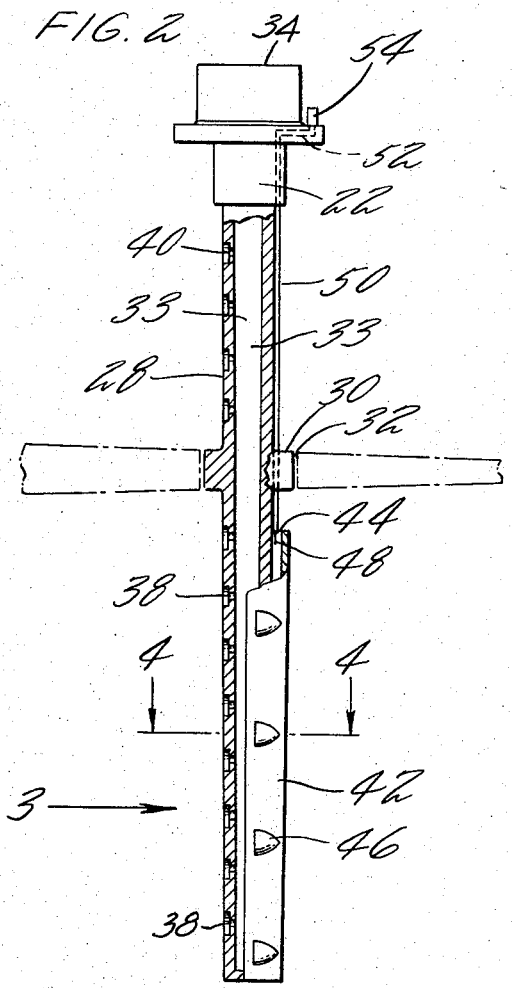
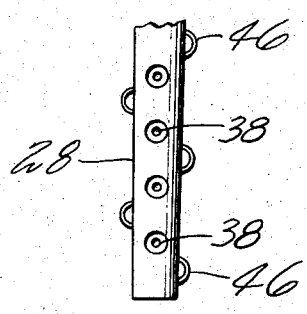
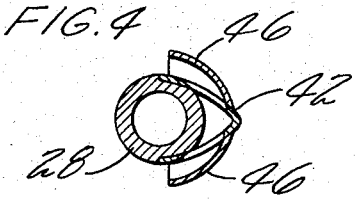
INVENTOR
CHARLES A. PEEK JR.
Charles A. Warren
ATTORNEY 3,343,417
TEMPERATURE AND PRESSURE PROBE
Charles A. Peek, Jr., Glastonbury, Conn., assignor to United Aircraft Corporation, East Hartford, Conn., a corporation of Delaware
Filed Apr. 12, 1965, Ser. No. 447,253
1 Claim. (Cl. 73—345)

ABSTRACT OF THE DISCLOSURE

A temperature and pressure measuring probe in a ducted fan type turbine engine includes a tubular member which extends through both ducts of the engine and has openings facing forwardly into the gas flow. A longitudinal passage extends through the tubular member to a pressure sensor which reads the average dynamic pressure in both ducts. An air scoop mounted on the tubular member in the inner duct leads gas to a thermocouple for reading temperature in the inner duct.

---

This invention relates to a temperature and pressure probe and is particularly adapted to use in a fan-type gas turbine engine.

In this type of engine, there are two flows of gas downstream of the turbine, the turbine exhaust in one duct and the fan air in a surrounding duct. It is desirable in controlling the thrust nozzle to know the temperature of the exhaust gases and the pressure of the gases and/or air since these parameters will determine the position of the nozzle. A feature of this invention is a probe by which to measure both these parameters in a single device. Another feature is a probe which averages the pressures in the two ducts. Another feature is a probe by which to assure a precise measure of the temperatures and pressure of the gas in the inner duct.

Other features and advantages will be apparent from the specification and claim, and from the accompanying drawings which illustrate an embodiment of the invention.

FIG. 1 is a sectional view through a portion of a turbofan type of gas turbine engine showing the invention therein.

FIG. 2 is a sectional view through the probe.

FIG. 3 is a view looking in the direction of the arrow 3 in FIG. 2.

FIG. 4 is a sectional view along the line 4—4 of FIG. 2.

Referring to the drawings, the invention is shown in conjunction with a turbofan type of gas turbine engine in which there are two concentric gas passages, an outer passage 2 for fan air defined between an outer duct wall 4 and a central duct wall 6 and an inner annular gas path 8 between the intermediate wall 6 and an inner duct wall 10. The passage 8 receives turbine exhaust gas from a turbine represented by a row of rotor blades 12 and straightening vanes 14. The duct 2 receives air from the fan at the upstream end of the engine, as shown, for example, in the Hopper Patent No. 2,979,900.

The two streams of gas mix a short distance downstream of the probe 16 since, as shown, the intermediate duct wall 6 terminates a short distance below the probe, the flow of air and turbine exhaust gas being represented by the arrows 18 and 20, respectively.

The probe 16 in the arrangement shown includes a base 22 mounted in the outer duct wall 4, the base preferably having a spherical ring 24 thereon to permit a small amount of angular positioning of the base within the duct wall. A suitable locking screw holds the base in position. The base has a projecting finger 28 which extends across both ducts or passages 2 and 8 and has a ring 30 thereon fitting within an opening 32 in the intermediate duct wall. The finger is made hollow by a longitudinal passage 33, as shown, and outwardly of the outer duct wall has an attachment means 34 to which a suitable pressure sensing device 36 is attached. The portion of the probe located within the duct 8 has a plurality of openings 38 therein arranged in a row longitudinally of the finger and extending from the outer surface of the probe into communication with the longitudinal passage 33 in the finger. These openings face in a direction opposite to the flow in the duct so that the dynamic pressure of the gas within the duct may be measured. The probe also has similar openings 40 in the portion of the finger located within the duct 2 so that the dynamic pressure of the fan air is imparted to the longitudinal passage. Since all of these holes are connected by a common longitudinal passage, it will be apparent that the result is a measurement of the average of both fan and turbine exhaust gas pressures, At this point in the particular type of engine described, both of these pressures are substantially the same and for the purpose of controlling the thrust nozzle located downstream of the engine, the average of the two pressures is the pressure desired for direct control purposes and may be used to determine jet thrust directly.

On the portion of the finger located within the turbine exhaust duct 8, the finger has a shield 42 surrounding the downstream side of the finger. This shield is closed at its inner end and is open at the outer end, the end near the intermediate duct wall 6, for the escape of gas from within the shield. Gas enters the shield through forwardly open scoops 46 located at opposite sides of the shield and communicating with the interior of the shield. Thus, when the engine is in operation, a small portion of the gas flowing through the duct 8 will enter the scoops 46 into the shield and flow out the opening of outer end 44. Adjacent the open outer end and within the shield is a thermocouple 48 by which to measure the temperature of the gas at this point. The thermocouple leads 50 extend along the downstream side of the finger 28 and are carried out through a passage 52 in the base 22 for the attachment of temperature sensing means represented by the box 54.

With this arrangement, the probe will sense an average of the pressure in both ducts 2 and 8 and will also sense an average of the exhaust gas temperature in the duct 8 since, as shown, the scoops 46 are uniformly spaced along the shield 42. In this way a single probe device serves to provide the necessary pressure and temperature measurements by which to adjust the thrust nozzle for the powerplant.

The combined probe, as above described, reduces weight as contrasted to two separate probes and relieves losses in the flow by minimizing obstructions to the flow. Also, as above stated, by averaging the pressures in both ducts, a pressure measurement is provided that is used directly in the determination of jet thrust or in the control of the thrust nozzle.

It is to be understood that the invention is not limited to the specific embodiment herein illustrated and described, but may be used in other ways without departure from its spirit as defined by the following claim.

I claim:

The combination with a turbofan gas turbine engine having inner, intermediate and outer concentric annular duct walls defining inner and outer passages, the inner of which receives and conducts turbine exhaust gas and the outer of which receives and conducts fan air of a probe having a base attached in the outer wall, said base having a projecting finger extending substantially radially across both passages, said finger having an integral ring in alignment with the intermediate duct wall and slideably fitting in an opening therein, said ring being larger in diameter than the combined dimension of the portion of the finger and shield in the inner passage and substantially sealing the opening in the intermediate duct between the inner and outer passages, said finger also having a longitudinal passage therein and having a row of holes in one side thereof, said openings facing in an upstream direction with respect to the flow of gas in the passages, the dynamic pressure of the gases in both passages being transmitted to said longitudinal passage, means for sensing the average pressure in said longitudinal passage, a shield on the side of the finger opposite to the holes and on the part of the finger in the inner passage, said shield extending longitudinally of the finger and being open at one end, a plurality of uniformly spaced scoops on the shield open in the same direction as the openings in the finger, said scoops communicating with the interior of the shield, and a thermocouple located in the shield adjacent to the open end thereof.

References Cited

UNITED STATES PATENTS

| | | | |
|---|---|---|---|
| 1,145,234 | 7/1915 | Dodge | 73—212 |
| 2,979,900 | 4/1961 | Hopper | 60—39.72 |
| 3,255,631 | 6/1966 | Franks | 73—345 |

FOREIGN PATENTS 734,702   8/1955   Great Britain.

LOUIS R, PRINCE, *Primary Examiner.*

F. SHOON, *Assistant Examiner.*